United States Patent [19]
Nobileau

[11] Patent Number: 4,717,183
[45] Date of Patent: Jan. 5, 1988

[54] CONICAL THREAD CONFIGURATION FOR RAPID MAKE-UP CONNECTION

[75] Inventor: Philippe C. Nobileau, Biot, France

[73] Assignee: Vetco Offshore Industries, Inc., Ventura, Calif.

[21] Appl. No.: 739,122

[22] Filed: May 29, 1985

Related U.S. Application Data

[63] Continuation of Ser. No. 511,204, Jul. 6, 1983, abandoned, and Ser. No. 535,621, Sep. 26, 1983, abandoned.

[30] Foreign Application Priority Data

Jul. 7, 1982 [FR] France .................. 82 11939
Jul. 20, 1982 [FR] France .................. 82 13381

[51] Int. Cl.$^4$ .............................................. F16L 17/02
[52] U.S. Cl. .................................... 285/334; 285/355
[58] Field of Search .............. 285/333, 334, 355, 390, 285/18, 391, 190

[56] References Cited

U.S. PATENT DOCUMENTS

| | | |
|---|---|---|
| 1,614,815 | 1/1927 | Wilson ................... 285/391 X |
| 1,637,628 | 8/1927 | Weisgerber ............ 285/334 X |
| 2,079,692 | 5/1937 | Lapointe . |
| 2,215,770 | 9/1940 | Sheffield . |
| 2,239,942 | 4/1941 | Stone et al. . |
| 2,587,544 | 2/1952 | Sneddon . |
| 2,885,225 | 5/1959 | Rollins . |
| 3,086,796 | 4/1963 | Yancey . |
| 3,129,963 | 4/1964 | Robbins . |
| 3,586,353 | 6/1971 | Lorenz et al. . |
| 3,918,823 | 11/1975 | Wilson . |
| 4,043,575 | 8/1977 | Roth . |
| 4,410,204 | 10/1903 | Reimert ................ 285/334 X |

FOREIGN PATENT DOCUMENTS

| | | |
|---|---|---|
| 460381 | 5/1928 | Fed. Rep. of Germany . |
| 628915 | 4/1936 | Fed. Rep. of Germany . |
| 701558 | 12/1940 | Fed. Rep. of Germany . |
| 41901221 | 1/1954 | Fed. Rep. of Germany . |
| 1506986 | 11/1967 | France . |
| 2464426 | 3/1981 | France . |
| 479017 | 11/1969 | Switzerland . |
| 804798 | 11/1958 | United Kingdom . |
| 897572 | 5/1962 | United Kingdom . |
| 2064041 | 6/1981 | United Kingdom . |

Primary Examiner—Dave W. Arola
Attorney, Agent, or Firm—Cushman, Darby & Cushman

[57] ABSTRACT

A conical thread configuration for providing a strong simple and rapid make-up connection of pin and box members particularly for connecting sections of pipes, casings and conductor pipes, anchoring pipes, wellheads and risers, particularly for offshore oil production. Each connecting member has a plurality (n) of thread lead entries on a frusto-conical surface, (n) being at least equal to two and at most equal to $AD \times p \times 1/6.25$ in which AD is the average diameter of the frusto-conical surface bearing threads (in inches) and p is the number of threads per inch. The radial dimension of the engaged thread overlap after make-up is smaller than the variation VR of the radius of the frusto-conical surface on one thread pitch and larger than $\frac{1}{2}$n of variation VR. Less than one turn is necessary for make-up or disconnection.

44 Claims, 10 Drawing Figures

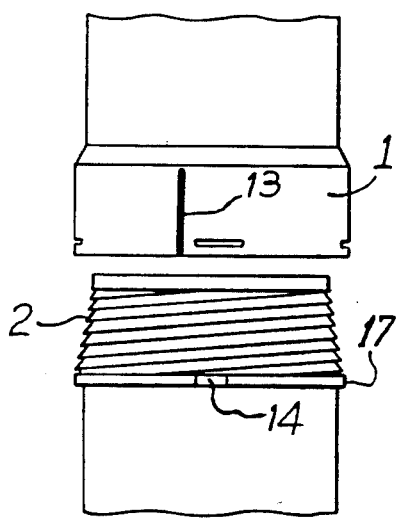
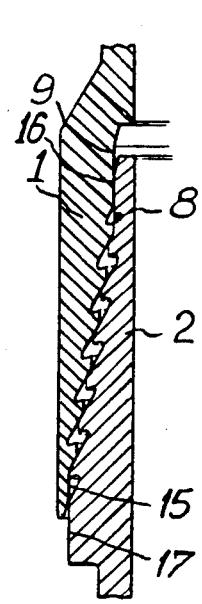
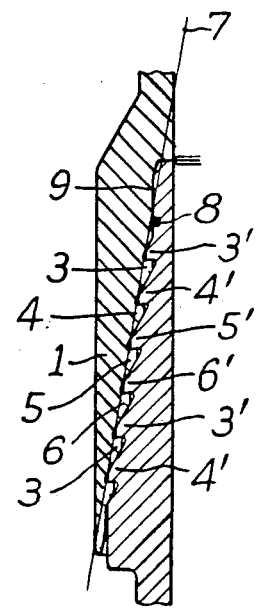
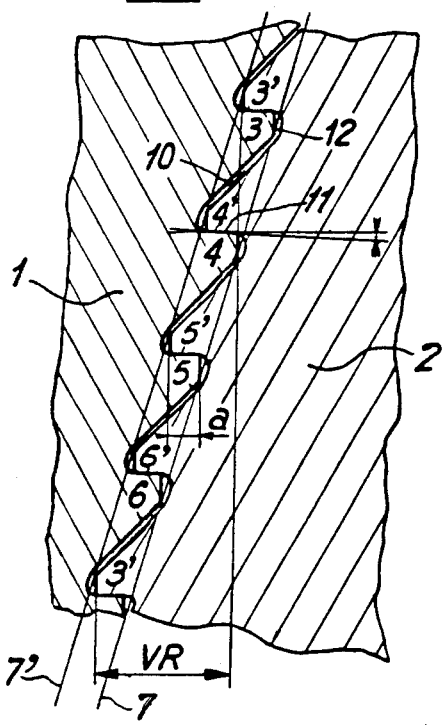
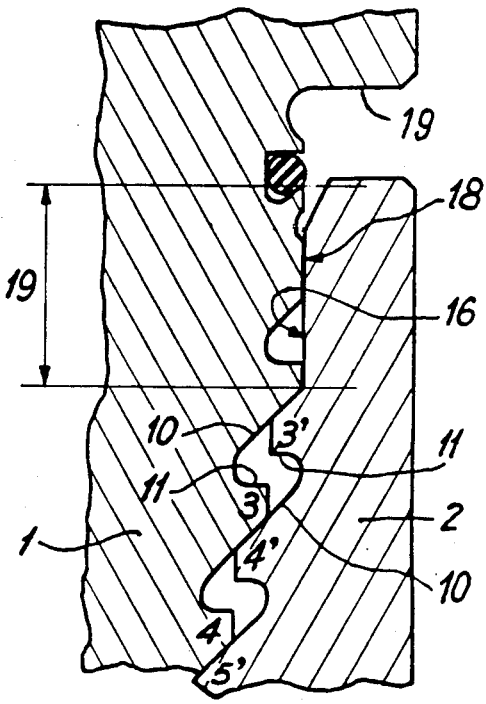

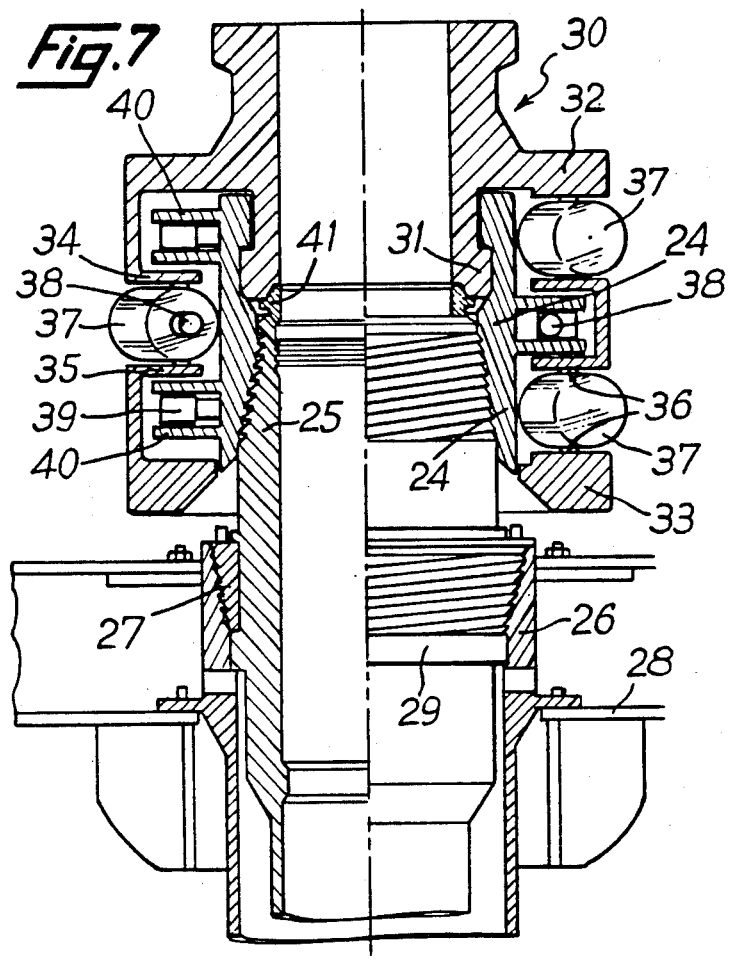
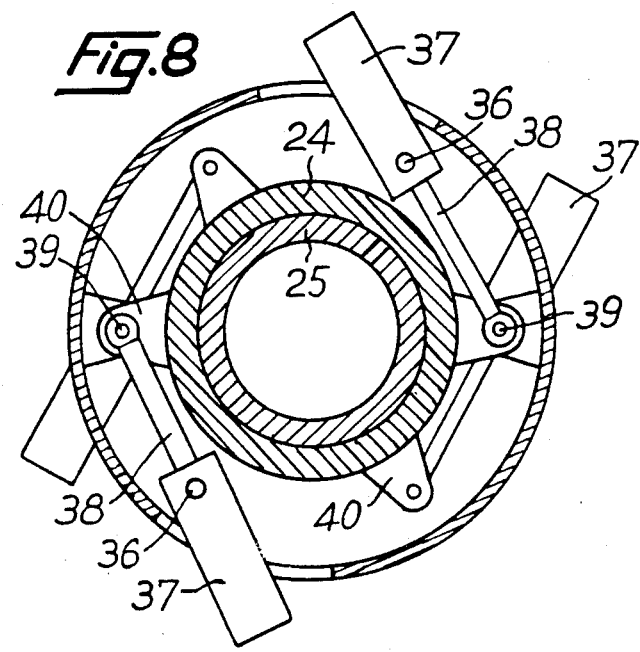

CONICAL THREAD CONFIGURATION FOR RAPID MAKE-UP CONNECTION

RELATED APPLICATIONS

This application is a continuation of both of my copending now abandoned applications Ser. No. 511204 filed July 6, 1983 and Ser. No. 535,621 filed Sept. 26, 1983, the disclosure of both of which is hereby incorporated hereinto by reference.

PREAMBLE

The invention pertains to tubular connections, comprising pin and box members mechanically interlocked to each other.

The object of the invention is to provide a strong, simple and extremely fast make-up connection, between sections of pipes of various diameters particularly suitable in the drilling industry to connect well casings, well conductor pipes, offshore platforms anchoring piles, wellhead to wellhead receptacle or B.O.P. stacks and offshore drilling risers.

In the early 1960's oil exploration and production went offshore, and the limitations of the technical possibilities of standard A.P.I. threaded or flange connections became apparent because of the increase in diameter of the connection required in offshore operation, the requirement of being able to make-up and disconnect underwater connections remotely, and the motions of the floating support where most of the offshore operations were taking place. Also the cost of field welding widely used onshore to connect sections of large pipe, become prohibitive due to the high hourly cost of offshore operations. In those early days, three types of connectors were introduced to solve these problems:

First, a specialized generation of thread connectors were designed, using modified A.P.I. conical thread, to extend the use of threaded casing connections larger than 16 inches for operation from a floating support. These threaded connectors are still widely used today, for dimensions below 24 inches, despite the requirement of a minimum of two and a half turn rotation for make-up.

This rotation is commonly achieved either by the use of a hydraulically actuated power tong which requires a specialized crew to operate, or the conventional "rope technic" consisting of pulling on a soft rope from the drilling rig main winch capstan. The rope is rigged three to five turns around the add-on casing piece body, and the pull rotates the pin and box members towards each other. Final make-up torque is reached by the use of a mechanical tong consisting of a large chain wrench having a lever extending radially to multiply the torque generated by the cathead chain hooked on the end of the lever. The other end of the cathead chain is pulled by a drilling rig main winch.

The maximum amount of rotation achieved in one stroke of such a mechanical tong/cathead chain assembly is around one quarter to one third of a turn without having to reset the assembly by manual reverse rotation.

A threadless second connector for larger diameter casings was also introduced based on snap-ring linkage. This "snap-ring type" connector offers fast make-up but offers neither the low weight-to-capacity ratio, nor the rigidity or price competitiveness of the threaded connector for a given capacity.

A third connector, featuring radial dogs, was introduced to replace flange connections, in a mechanical configuration for drilling riser connections, and in a hydraulic configuration for wellhead connections.

Recently, the use of dog type connectors has been extended to offshore platform anchoring pile connections, but its success has been limited by its high cost, due to the large number of parts and heavy section required in the design and manufacturing of such a connector.

In the 1970's, two other types of connectors were introduced:

First, an "L type" connector, featuring large dimensioned threads or circular grooves; cylindrical or conical have been used. Such threads or grooves are milled out on at least two sections limited by cylindrical or conical generatrix, in order that make-up of the connector can be achieved by axial stabbing, followed by a rotation of a fraction of a turn to bring the remaining portions of threads or grooves into an interlocking configuration. The make-up rotation is limited to a maximum of a quarter of a turn.

The major drawback of this connector, despite the fast make-up characteristics, is the cost of manufacturing, due to the extensive milling operation and the capacity-to-weight ratio, due to the removal of 50% of the loading surfaces.

The second connector is a no rotation "interference type" connector mainly designed for permanent application such as offshore platform conductor pipe or anchoring pile. It presents the major drawbacks of not being disconnectable and requiring a special bulky hydraulic clamping unit, operated by a specialized crew, for make-up.

The present invention provides a conical thread configuration for the connection of casing, conductor pipe, anchoring pipe, wellhead and risers, comprising pin and box members, wherein each member has a plurality n of threads with respective lead entries, i.e., n threads for each turn of one thread, n being at least equal to two and at most equal to $AD \times p \times 1/6.25$ in which AD is the average diameter of the frusto-conical surface bearing the threads (in inches) and p is the number of threads per inch.

The immediate result of the invention after stabbing the pin and box members, is to obtain full make-up of the pin and box threads by only a rotation of a fraction of a turn, while the entire length of threads is fully engaged over the entire periphery of the interlocking surfaces, since each thread extends over more than one turn. This fraction of a turn make-up may be up to about one turn and preferably is one turn divided by n, and at least one half of a turn divided by n; in another embodiment, it is at most about one half of a turn.

The conical thread configuration, according to the invention, combines the advantage of the "L type" connectors, i.e., featuring complete make-up by axial stabbing followed by a rotation of a fraction of a turn, without having the drawback thereof, namely, the low capacity-to-weight ratio and high manufacturing cost, and the advantage of the specialized threaded connector, i.e., high capacity-to-weight ratio and low manufacturing cost, without having the drawback of requiring a power tong or even the rope phase since in the preferred case, only one stroke of the mechanical tong/cathead chain assembly is required to fully make-up the connector.

The fraction of a turn make-up allows the thread configuration of the invention to be used in numerous types of connection whether they are madeup manually or by means of hydraulic cylinders for remote control. One advantage of the fractional turn makeup is the ability to use a simple method of grasps and rotate the connector. For instance, a hydraulic piston could rotate a connector almost a half turn with a simple pull. A gear ring having a "U" shaped opening could be easily placed on the pipe. A spur gear could then rotate the connector ⅜ of a turn or slightly more. When a full turn is exceeded the coupling must be regripped or full rotation equipment used.

In a particular embodiment, the box member may serve as means for connecting a wellhead connector on a wellhead housing. In this case, the pin member may be the wellhead housing with n threads on its conical outer upper part. The box member normally swivels on a stationary wellhead connector body and receives hinged hydraulic cylinders including rods connected to the box member in order to drive the box member in rotation with regard to the stationary wellhead connector body.

This feature is very relevant to the invention, since only the known rigid "dog type" connector box assembly has been successfully remotely controlled by the addition of a cam ring operated by vertical hydraulic cylinders. Such "dog type" connector box assemblies comprises numerous parts beside the cylinders: dogs, cam, ring, etc... while the remotely actuated connector according to the invention has a box assembly which comprises only two parts: the wellhead connector body and the swivelling box member beside the cylinder.

The thread profile according to the invention can be of many different types. For example, in a first embodiment, the thread profile features several adjacent grooves having the same radius and identical variation of radius along the conical helix of the thread. In another embodiment, the thread profile may be triangular or trapezoidal.

The invention will be more readily understood by reading the following description with reference to the following accompanying drawings:

BRIEF DESCRIPTION OF THE DRAWINGS

FIG. 1 is a view in elevation of the connector according to the invention before stab-in;

FIGS. 2 and 3 show partial sectional views of the connector after stab-in and after make-up, respectively;

FIG. 4 is an enlarged partial view of FIG. 3 in greater detail;

FIG. 5 is an enlarged partial view of a variant of FIG. 2;

FIG. 7 illustrates a subsea wellhead featuring applications of the thread configuration of the invention;

FIG. 8 is a radial section of FIG. 7; and

DETAILED DESCRIPTION

Figure 4A:
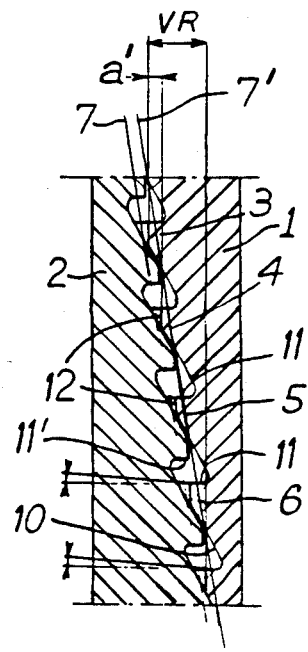
FIG. 4A is an enlarged partial view of a FIG. 2 type arrangement.

Referring now to the drawings, the connector of FIGS. 1 to 5 comprises a box or female member 1 and a pin or male member 2. In the examples shown, the members are connected by means of four threads 3,4,5 and 6 for box 1 and 3',4',5' and 6' for the pin 2, the threads numbering four per turn of any one of them, i.e., the four threads on each member have lead entries spaced 90° apart.

In FIG. 4, the threads are shown engaged. The thread profile of the box 1, in an axial plane, comprises a stabbing flank or sliding slope 10, and a load flank or radially extending side 11 which inclines as shown by a small angle, i.e., 5°, relative to the radial direction in the same angular direction as sliding slope 10. Both flanks 10 and 11 are linked on one thread by a vertical crest or vertex 12. The thread profile of the pin 2 is identical to the thread profile of the box 1.

Each thread of the box and pin is preferably cut out of respective conical surfaces, e.g., the threads of the box 1 are initially cut into a conical surface 7, and the threads of the pin 2 are cut into a conical surface 7'.

Surfaces 7 and 7' are at the same angle relative to the longitudinal axes of box 1 and pin 2, which angle is preferably in the range of about 2.3° to about 9.5°. The smaller angle is preferred for restricted thickness applications and the larger angle for unrestricted thickness applications.

When stabbing the box member 1 over the pin member 2, the connector may be aligned as shown in FIG. 5 such that the thread 4 of the box 1 just clears the crest of the thread 4' of the pin 2 and the stabbing flank 10 of the thread 4 lands on the stabbing flank 10 of the thread 5'.

Since there are four thread starts or lead entries, a rotation of a quarter of a turn of the box 1 while the pin stays stationary (or vice versa), decreases the radius of the thread 4 of the box because thread 4 slides upwardly on its sloping flank 10 toward the member axis, until the load flanks 11 of the threads 4 and 4' come in contact, and the nose of pin 2 contacts the shoulder 19 of box 1.

With four thread starts, spacing the shoulder to obtain a ¼ turn makeup produces an overlap of VR/4. In FIG. 4 the predetermined dimension (a) represents the radial dimension of the engaged thread overlap.

According to one aspect of the invention, this dimension (a) is smaller than approximately half of the variation VR of the radius of the conical surface 7 or 7' which bears the thread, per one thread turn. With this relationship, it is ensured that, independently of the number of thread lead entries, it will need at most about half of a turn to disengage the threads from the tight make-up position to the position where an actual separation of the members is possible.

In the embodiment of FIG. 4, the dimension (a) is equal to a quarter of the variation VR and since there are four threads per turn of one (n=4), only a quarter of a turn is needed to disengage the two members fully.

It should be pointed out that, in the case of FIG. 4, (n) times the projection of one engaged thread overlap on a radial plane corresponds exactly to the envelop of the projection of the engaged thread overlaps of all the threads. As a matter of fact, projection of engaged thread 4, 4' overlap is exactly adjacent to projection of engaged thread 3,3' overlap and engaged thread 5,5' overlap, after rounding up functional clearances and machining tolerances. The ratio between the addition of the projected engaged thread overlaps of each thread and the envelope of the projection of the engaged thread overlaps of all the threads is a relevant criteria of the capacity of the connection. In the general case, this ratio $r = na/VR$ and the make-up or disconnection turn fraction $F = r/n$.

So, if (a) is equal to $VR/n$, n being the number of threads per one turn of one thread or the number of thread lead entries, the above defined ratio is equal to 1, which is the preferred value for connector diameters larger than 16 inches.

In case (a) is greater than VR/n, the above defined ratio is greater than 1 and the disconnection rotation is more than 1/nth turn. On the other hand, with (a) smaller than VR/n the above defined ratio is smaller than 1 and the disconnection rotation less than 1/nth turn. Generally, it is not recommended to select a value for (a) smaller than VR/2n since, in this case, the total of the engaged thread overlap surfaces is less than one half of the projected envelope and the mechanical capacity of the connection is greatly reduced.

There are valid reasons for willfully deviating from this preferred value under certain conditions. With threaded and coupled pipe the threads must be cut on the existing thickness of the pipe, therefore the wall thickness and pipe material limitations are restricting. Under this situation it is desirable to increase the thread contact surface by approaching "a" equal to 2VR/n.

On the other hand small diameter pipe with strong coupling, such as drill pipe is effectively limited to about two thread starts. More would yield small threads which would be too easily damaged in use. Here, it would be desirable to decrease the thread contact, approaching "a"=VR/2n, to achieve rapid make up, such as ¼ turn with two threads. The reduced overlap is acceptable because of the larger dimension of the coupling.

It can be deduced from the above, that by increasing the number of thread lead entries, the rotation angle to make-up the connection can be reduced, but for a given diameter and dimension of thread this number cannot be increased indefinitely without compromising the self-locking characteristic of the connection. In order to stay below the minimum friction coefficient of steel-to-steel lubricated surfaces of 0.06, the number of thread lead entries n should be limited to less than $$\frac{AD \times p}{6.25}$$

in which:

AD is the average diameter of the frusto-conical surface bearing the threads, in inches, and p is the number of threads per inch.

An axial load operating on the flank of each tooth produces a force component perpendicular to the surface and one parallel to the surface due to the taper of the thread. The component parallel to the surface tends to rotate the connector apart. Friction, which is a function of the perpendicular component resists the rotation.

The above limit for n is based on the desire to have the threads self-locking, i.e., so that the members would not rotate apart under axial tension. It is desirable to have a coefficient of safety of no less than 1.2, preferably 2.0. An example of a preferred configuration with a safety factor of 2 is AD=20 inches and p=2.5, which leads to 2≦n≦8. The frusto-conical height will be sufficient, on each member 1 and 2 to allow a thread to intersect at least twice a determined generatrix of the frusto-conical surface.

Like FIG. 2, FIG. 4A shows only partial mating of the box or female member 1 and the pin or male member 2, i.e., just after stab-in and before the locking twist. Again there are four threads 3, 4, 5, 6 on member 1 (and similarly on member 2) per single turn of one of them, and each has a vertex or crest 12, an inclined side or sliding slope 10 and a load flange or side 11 which generally extends in the radial direction but is inclined as shown a small angle relative to the radial direction in the same angular direction as side 10. Between sides 10 and 11 is a groove forming the bottom or root of each thread. The inside corner of each vertex of member 1 is on a line 7, and of member 2 on a line 7', the generatrix of such lines being a frusto-conical surface of revolution. Again n=4 in FIG. 4A, and the variation of radius or maximum radial dimension for one turn of one of the n threads is shown as VR.

This is, however, an interference type connector, where rotation is stopped not by the nose and shoulder contact, but by the bottoming out of the threads. The offset or predetermined radial distance (a') in this embodiment, however, is measured from the crest 12 of each thread to the root of the next adjacent groove as shown and is in this particular instance equal to VR/n. The radial overlap (a) of FIG. 4 is equal to the offset (a') of FIG. 4A when the members fully mate with sides 11 and 11' in contact after one-quarter of a turn. The members are fully mated when they can no longer be rotated with respect to one another.

The overlap, as defined in the FIG. 4 discussion, relates to the made up connector, regardless of whether rotation is stopped by the nose and shoulder contact (as in FIG. 4), or the thread bottom contact (as in FIG. 4A). The offset, as defined in the FIG. 4A discussion, relates only to the interference type connector, where the nose and shoulder are not intended to contact. Offset will be equal to overlap in an interference type connector, but will be greater than overlap when the nose and shoulder interaction stop rotation.

The radial dimension including at least the engaged thread overlap after make-up is smaller than variation VR of the radius of the frusto-conical surface for one turn of one of the n threads, preferably equal to or larger than VR/n, and larger than ½n of such variation VR, i.e., $$\frac{VR}{2n} < a < VR$$

Sealing by the connector members may be ensured with the aid of well-known O-rings. An O-ring 8 has been shown in FIGS. 2 and 3 in one groove of member 2. At the end of connection by rotation, the O-ring 8 slides on the vertical part 9 of the member 1.

To reduce the make-up rotation to a value close to the release rotation, a mark 13 can be located on the box 1 as shown in FIG. 1. This mark will be lined-up with a milled portion 14 of the surface 17.

Figure 6:
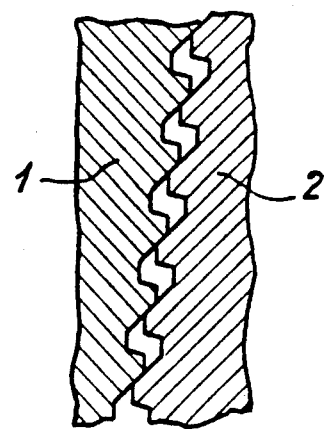
FIG. 6 shows a variant of the thread profile.

FIG. 6 illustrates a trapezoidal variant of the thread profile. These threads are machined so that the crests of the threads of one member fill-up completely the bottoms of the threads of the other member when the connector is made-up. In this particular case, the thread profile radial height is equal to the radial dimension (a) as defined above.

FIG. 5 is similar to FIG. 2 but the O-ring 8 is shown in a different position in FIG. 5 which also details the upper end to a greater extent as discussed below.

In FIG. 2, it can be seen that a cylindrical surface 15 terminates the conical thread on the entry end of the box member 1. Similarly, a cylindrical surface 16 terminates the threaded part of the pin member 2. Surfaces 15 and 16 are used for mutual axial alignment of the two members and to achieve this, the surface 15 rides on a mating surface 17 of the member 2 and the surface 16 rides on a mating surface 9 of the member 1. FIG. 5 shows that the mating surface 9 of FIG. 2 is in fact an interrupted cylindrical surface 18, being the result of truncating the crests of the threads of the box member on the area 19. An acceptable alignment of mating surfaces 16 and 18 is only possible if the number of the thread lead entries n at least equals three so that surface 16 while engaging into the area 19, always finds at least three centralizing alignment points.

It will be understood that a similar arrangement can be located between surfaces 15 and 17.

The applications of the thread configuration according to the invention, are numerous, and in particular in the design of underwater connectors, i.e., connectors featuring remote controlled make-up and disconnection.

As an example, FIGS. 7 and 8 show two thread configurations according to the invention located on a subsea wellhead, with the box or coupling members 24 and 26 receiving the pin members 27 and 25.

The upper part of the wellhead housing 25 is threaded, according to the invention, as a pin member with eight threads per turn of one of them, (n=8) for instance, and receives the box member 24.

The wellhead connector includes a body 30, which extends internally to the top of the wellhead housing 25 by a flange 31, which traps vertically the swivelling box member 24. Outside of the box member 24, the wellhead connector body 30 extends downwards to support brackets 32, 33, 34, 35, receiving vertically hinged 36 hydraulic cylinder bodies 37. The ends of the rods 38 of the hydraulic cylinders 37 are hinged vertically 39 on brackets 40 extending radially out of said box member 24. Hydraulic fluid injected into cylinders 37 rotates the box member 24, with regard to the wellhead connector body 30, to connect or disconnect the box member 24 on the wellhead housing 25. Sealing between the wellhead housing 25 and the wellhead connector 30 is insured by a metal gasket 41.

The lower part of the wellhead housing 25 includes a flange 29, said flange 29 receiving, on its upper surface, a swivelling pin member 27, trapped on said wellhead housing 25. The wellhead housing 25 is lowered into the wellhead receptacle 28 extending upwardly by the box member 26. Rotation of the locking pin member 27 is operated remotely from a running tool including the same hydraulic cylinders as wellhead connector 30. This last use of the thread configuration according to the invention, provides a rigid connection between wellhead housing and wellhead receptacle while the known connection means, only of the loose connection type, presents weaknesses under strong alternative bending loading.

Figure 9:
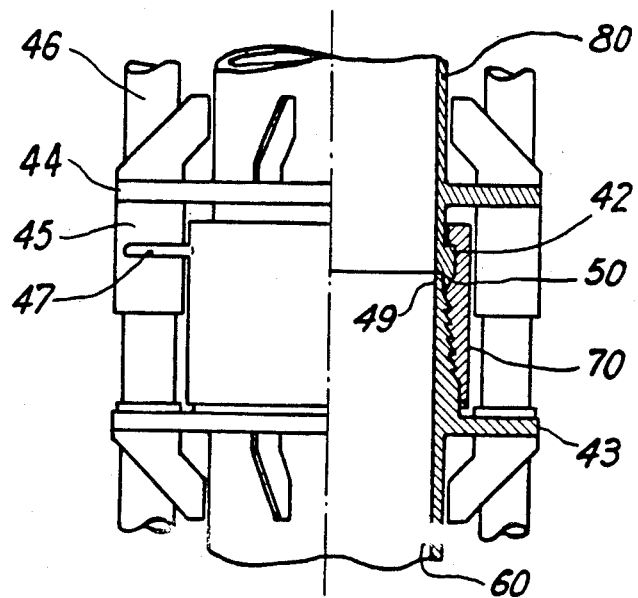
FIG. 9 is an elevating partial sectional view of a riser connector as an application of the thread configuration of the invention.

Another embodiment of the invention exists, in particular for connecting drilling or production risers used in offshore oil production as shown in FIG. 9. The lower riser upper-end fitting 60 has six threads per turn of one of them (n=6) on a pin member configuration, according to the invention. The upper riser lower-end fitting 80 traps a swivelling box member 70 in an arrangement similar to that of box member 24 with regard to wellhead connector body 30. The cylindrical surface 49 of the pin member seals flange 42 of said riser lower-end fitting 80 onto the riser upper-end fitting 60 through a resilient seal ring 50 located in a groove of flange 42.

The riser pipes 60 and 80 receive flanges 43 and 44 respectively to support stab pin and box receptacles or sleeves 45 of safety lines 46.

After stabbing of the riser lower-end 80 on the riser upper-end 60, a rotation of a sixth of a turn of the box member 70 by the lever 47 makes-up the connection.

An interference type connector and a shouldering type connector have each been described. These may be combined to advantage, by tolerancing the connector to have the threads bottom out just before the connector shoulders. Radial strain will occur whereby radial locking friction operates in addition to the axial locking friction described before.

Finally, it will be noted that, by an astute combination of the dimensions of the diameter of the connector, the thread pitch and the conicity of the nominal surfaces, the invention makes it possible to preserve the self-locking characteristics of the linkages by conventional thread and therefore to create pre-stresses whilst maintaining the advantages of a bayonet-type coupling. Finally, it should be noted that the arrangements of the invention are also applicable to the constitution of anchoring piles in offshore platforms.

It is to be understood that the foregoing embodiments are only representative of the invention, the scope of which is determined by the appended claims.

I claim:

1. Apparatus for making a connection between two tubular elements comprising:
   mateable male and female members respectively for said elements,
   each said member including at one open end a plurality of threads having corresponding points forming an axially extending frusto-conical surface of revolution,
   the threads of one member being complementary to the threads of the other member,
   said plurality of threads on each member including a plural number n of threads having a difference VR in radial dimension for one turn of each of said n threads,
   each said thread having a first side, which faces away from said one open end of the respective member and having a second inclining side which faces toward said open end of the respective member, there being a groove between said sides of each thread which defines the thread root,
   said first sides of opposing threads of the members when fully mated being in contact and overlapping a given amount,
   there being a predetermined radial distance including said given overlapping amount and extending along each of those contacting sides,
   said predetermined radial distance being smaller than approximately one-half VR.

2. Apparatus as in claim 1 wherein the said first side of each thread extends substantially in a radial direction.

3. Apparatus as in claim 1 wherein each said thread includes a crest joining adjacent first and second sides and said predetermined radial distance is at least equal to VR/n as measured from the crest of one thread on one of said members to the bottom of the groove of the adjacent thread of said one member.

4. Apparatus as in claim 1 wherein each said thread includes a vertex joining adjacent first and second sides and said predetermined radial distance is larger than VR/2n as measured from said thread vertex of one member to the opposing thread vertex of the other member when said members are fully mated.

5. Apparatus as in claim 1, 2, 3 or 4 wherein n is at most equal to $$AD \times p \times 1/6.25$$

in which:
AD is the average diameter in given units of measurement of said conical surface of revolution along its thread bearing length, and
p is the number of threads per unit.

6. Apparatus as in claim 1 wherein said radially extending first side of each thread is inclined slightly from the radial direction in the same angular direction as the incline of said second side.

7. Apparatus as in claim 1, 2, 3 or 4 wherein each thread intersects at least twice a determined generatrix of said frusto-conical surface.

8. Apparatus as in claim 1, 2, 3 or 4 wherein said threads have truncated crests.

9. Apparatus as in claim 1 wherein each thread includes a load flank as said radially extending first side and a stabbing flank as said inclined second side and when the male member is located under the female member, each load flank offers a slope raising towards a longitudinal axis of the members.

10. Apparatus as in claim 1, 2, 3 or 4 including a wellhead housing having means trapping a swivelling ring on which said male member threads are present, the female member and its threads being on a wellhead receptacle.

11. Apparatus as in claim 1, 2, 3 or 4 wherein the male member threads are at the top of a wellhead housing, the female member threads being located on a swivelling ring of a wellhead connector body, said ring being interconnected by means of hydraulic cylinders with said body.

12. Apparatus as in claim 1, 2, 3 or 4 wherein the male member threads are on the end fitting of a drilling or production riser section, the female member threads being on a swivelling ring of another riser section end fitting.

13. Apparatus as in claim 1 wherein the number n of threads is at least equal to three, each of said members includes one cylindrical surface terminating the threaded section-on the stab-in end, said cylindrical surface of one member having a mating surface riding, for alignment of said members prior to make-up rotation, on a mating surface of the other member, at least one of said mating surfaces being an end section of said threads, said section having thread crests truncated cylindrically.

14. Apparatus as in claim 1, 2, 3 or 4 wherein one of said tubular elements is a tube having said mateable male member on one end and the other tubular element is a coupling having said female member on one end, there being a third tubular element connected to the other end of said coupling by flange means.

15. Apparatus as in claim 12 wherein said one mating surface is located in said female member.

16. Apparatus for making a connection between two elements comprising:
mateable male and female members respectively for said elements,
each said member including a plurality of threads having corresponding points forming an axially extending frusto-conical surface of revolution,
the threads of each member being complementary relative to the threads of the other member,
said plurality of threads on each member including a plural number n of threads per one turn of one of said n threads,
each of said n threads having a crest which at least partially extends substantially axially and a first side which radially extends away from an adjacent end of said crest at an angle near 90° relative to said crest and a second side which slopes away from said crest adjacent the opposite end thereof,
adjacent threads on each member being connected by a groove between the said first side of one thread and the adjacent second side of the next thread,
the conicity of said frusto-conical surface in conjunction with the structure of said n threads being such that said male and female members may be intially mated without relative rotation so that each of said second sides of the one member slides on the respective second sides of the other member when said members are tightened by relative rotation of approximately 1/nth turn until the first thread sides that were adjacent each other when the second sides came to rest are in contact with each other for full mating, the circumferential length of said threads on each member being greater than 1/nth turn.

17. Apparatus as in claim 16 wherein n is at most equal to $$AD \times p \times 1/6.25$$

in which:
AD is the average diameter in given units of measurement of said conical surface of revolution along its thread bearing length, and
p is the number of threads per unit.

18. Apparatus for making a connection between two tubular elements comprising:
mateable male and female members respectively for said elements,
each said member including at one open end a plurality of threads having corresponding points forming an axially extending frusto-conical surface of revolution,
the threads of one member being complementary to the threads of the other member,
said plurality of threads on each member including a plural number n of threads having a difference VR in radial dimension for one turn of each of said n threads,
each said thread having a first side, which faces away from said one open end of the respective member and which extends substantially in a radial direction, and having a second inclining side which faces toward said open end of the respective member, there being a groove between said sides of each thread which defines the thread root,
said first sides of opposing threads of the member when fully mated being in contact and overlapping a given amount,
there being a predetermined radial distance of said given overlapping amount and extending along each of those contacting sides,
said predetermined radial distance being smaller than one-half VR.

19. Apparatus as in claim 18 wherein one of said members has a shoulder and the other a nose which make contact when the members are fully mated.

20. Apparatus as in claim 19 wherein each said thread includes a crest joining adjacent first and second sides and said predetermined radial distance is at least equal to VR/n as measured from the crest of one thread on one of said members to the bottom of the groove of the adjacent thread of said one member.

21. Apparatus as in claim 18, 19 or 20 wherein the second sides of said opposing threads of the members are in contact when the members are fully mated.

22. Apparatus as in claim 18 or 19 wherein each said thread includes a crest joining adjacent first and second sides and said predetermined radial distance is at least equal to VR/n as measured from the crest of one thread on one of said members to the bottom of the groove of the adjacent thread of said one member.

23. Apparatus as in claim 21 wherein each said thread includes a vertex joining adjacent first and second sides and said predetermined radial distance is larger than VR/2n as measured from said thread vertex of one member to the opposing thread vertex of the other member when said members are fully mated.

24. Apparatus as in claim 18 or 19 wherein said threads on both members have crests which mate with and contact opposing one of said grooves when the members are fully mated.

25. Apparatus for making a connection between two tubular elements comprising:
  mateable male and female members respectively for said elements,
  each said member including at one open end a plurality of threads having corresponding points forming an axially extending frusto-conical surface of revolution,
  the threads of one member being complementary to the threads of the other member,
  said plurality of threads on each member including a plural number n of threads having a difference VR in radial dimension for one turn of each of said n threads,
  each said thread having a first side, which faces away from said one open end of the respective member and having a second inclining side which faces toward said open end of the respective member, there being a groove between said sides of each thread which defines the thread root,
  said first sides of opposing threads of the members when fully mated being in contact and overlapping a given amount,
  there being a predetermined radial distance including said given overlapping amount and extending along each of those contacting sides,
  said predetermined radial distance being smaller than VR.

26. Apparatus as in claim 25 wherein the said first side of each thread extends substantially in a radial direction.

27. Apparatus as in claim 25 wherein each said thread includes a crest joining adjacent first and second sides and said predetermined radial distance is at least equal to VR/n as measured from the crest of one thread on one of said members to the bottom of the groove of the adjacent thread of said one member.

28. Apparatus as in claim 25 wherein said first side of each thread extends substantially in a radial direction and is inclined slightly from the radial direction in the same angular direction as the incline of said second side.

29. Apparatus as in claim 25, 26, 27 or 28 wherein each thread intersects at least twice a determined generatrix of said frusto-conical surface.

30. Apparatus as in claim 25, 26, 27 or 28 wherein said threads have truncated crests.

31. Apparatus as in claim 25 wherein each thread includes a load flank as said first side and a stabbing flank as said inclined second side and when the male member is located under the female member, each load flank offers a slope raising towards a longitudinal of the members.

32. Apparatus as in claim 25, 26, 27 or 28 including a wellhead housing having means trapping a swivelling ring on which said male member threads are present, the female member and its threads being on a wellhead receptacle.

33. Apparatus as in claim 25, 26, 27 or 28 wherein the male member threads are at the on top of a wellhead housing, the female member threads being located on a swivelling ring of a wellhead connector body, said ring being interconnected by means of hydraulic cylinders with said body.

34. Apparatus as in claim 25, 26, 27 or 28 wherein the male member threads are on the end fitting of a drilling or production riser section, the female member threads being on a swivelling ring of another riser section end fitting.

35. Apparatus as in claim 25, 26, 27 or 28 wherein one of said tubular elements is a tube having said mateable male member on one end and the other tubular element is a coupling having said female member on one end, there being a third tubular element connected to the other end of said coupling by flange means.

36. Apparatus for making a connection between two elements comprising:
  mateable male and female members respectively for said elements,
  each said member including a plurality of threads having corresponding points forming an axially extending frusto-conical surface of revolution,
  the threads of each member being complementary relative to the threads of the other member,
  said plurality of threads on each member including a plural number n of threads per one turn of one of said n threads,
  each of said n threads having a crest which at least partially extends substantially axially and a first side which radially extends away from an adjacent end of said crest at an angle near 90° relative to said crest and a second side which slopes away from said crest adjacent the opposite end thereof,
  adjacent threads on each member being connected by a groove between the said first side of one thread and the adjacent second side of the next thread,
  the conicity of said frusto-conical surface in conjunction with the structure of said n threads being such that said male and female members may be initially mated without relative rotation so that each of said second sides of the one member slides on the respective second slides of the other member when said members are tightened by relative rotation of only 1/nth turn until the first thread sides that were adjacent each other when the second sides came to rest are in contact with each other for full mating, the circumferential length of said threads on each member being greater than 1/nth turn.

37. Apparatus for making a connection between two tubular elements comprising:

mateable male and female members respectively for said elements, each said member including at one open end a plurality of threads having corresponding points forming an axially extending frusto-conical surface of revolution, the threads of one member being complementary to the threads of the other member, said plurality of threads on each member including a plural number n of threads having a difference VR in radial dimension for one turn of each of said n threads, each said thread having a first side, which faces away from said one open end of the respective member and having a second inclining side which faces toward said open end of the respective member, there being a groove between said sides of each thread which defines the thread root, said first sides of opposing threads of the member when fully mated being in contact and overlapping a given amount, there being a predetermined radial distance of said given overlapping amount and extending along each of those contacting sides, said predetermined radial distance being smaller than VR.

38. Apparatus as in claim 37 wherein the said first side of each thread extends substantially in a radial direction.

39. Apparatus as in claim 37 wherein one of said members has a shoulder and the other a nose which make contact when the members are fully mated.

40. Apparatus as in claim 39 wherein each said thread includes a crest joining adjacent first and second sides and said predetermined radial distance is at least equal to VR/n as measured from the crest of one thread on one of said members to the bottom of the groove of the adjacent thread of said one member.

41. Apparatus as in claim 37, 38, 39 or 40 wherein the second sides of said opposing threads of the members are in contact when the members are fully mated.

42. Apparatus as in claim 41 wherein each said thread includes a crest joining adjacent first and second sides and said predetermined radial distance is at least equal to VR/n as measured from the crest of one thread on one of said members to the bottom of the groove of the adjacent thread of said one member.

43. Apparatus as in claim 41 wherein each said thread includes a vertex joining adjacent first and second sides and said predetermined radial distance is larger than VR/2n as measured from said thread vertex of one member to the opposing thread vertex of the other member when said members are fully mated.

44. Apparatus as in claim 37, 38 or 39 wherein said threads on both members have crests each of which mate with and contact a respective opposing one of said grooves when the members are fully mated.

* * * * *